(12) United States Patent
Tsukamoto

(10) Patent No.: US 7,016,067 B1
(45) Date of Patent: Mar. 21, 2006

(54) IMAGE OUTPUT APPARATUS

(75) Inventor: Toshikatsu Tsukamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 790 days.

(21) Appl. No.: 09/672,028

(22) Filed: Sep. 29, 2000

(30) Foreign Application Priority Data

Oct. 19, 1999 (JP) .................... 11-296943

(51) Int. Cl.
G06F 15/00 (2006.01)
H04N 1/00 (2006.01)
H04N 1/40 (2006.01)

(52) U.S. Cl. .............. 358/1.16; 358/1.18; 358/1.17; 358/470; 358/444; 358/403; 358/404

(58) Field of Classification Search ............ 358/1.18, 358/1.16, 1.17, 403, 404, 470, 444
See application file for complete search history.

(56) References Cited

U.S. PATENT DOCUMENTS

| | | | | |
|---|---|---|---|---|
| 5,051,779 A | * | 9/1991 | Hikawa | 399/84 |
| 5,881,214 A | * | 3/1999 | Morisawa et al. | 358/1.18 |
| 5,933,548 A | * | 8/1999 | Morisawa | 382/305 |
| 6,426,806 B1 | * | 7/2002 | Melen | 358/468 |

FOREIGN PATENT DOCUMENTS

| | | |
|---|---|---|
| JP | 3-291755 | 12/1991 |
| JP | 5-328065 | 12/1993 |
| JP | 9-194127 | 7/1997 |
| JP | 9-221263 | 8/1997 |
| JP | 09221263 A * | 8/1997 |
| JP | 10-13643 | 1/1998 |

* cited by examiner

*Primary Examiner*—Edward Coles
*Assistant Examiner*—Chan S. Park
(74) *Attorney, Agent, or Firm*—Smith, Gambrell & Russell LLP

(57) ABSTRACT

Disclosed is an image output apparatus having an image reading section, an image storing section for storing image data read by the image reading section, and an image output section for outputting an image corresponding to a document on the basis of the image data stored in the image storing section. The apparatus further includes an index recognizing circuit for image-recognizing index information on an index sheet when the index sheet is read by the image reading section, and an index registering circuit for registering the recognized index information and storage area designation information for designating a storage area in the image storing section, associated with each other. The image data representing the document which has been read by the image reading section subsequently to the index sheet is stored in a storage area, in the image storing section, to be designated by the storage area designation information associated with the index information.

4 Claims, 9 Drawing Sheets

IMAGE OUTPUT APPARATUS

BACKGROUND OF THE INVENTION

1. Field of the Invention

The present invention relates to an image output apparatus having a document reading section and an image output section, such as, a digital copying machine.

2. Description of Related Art

A digital copying machine or a so-called composite machine (an image forming apparatus having both a facsimile function and a copying function) comprises a document reading section for optically reading a document, an image memory for storing image data representing an image on the document read by the document reading section, and an image forming section for reading out the image data from the image memory to form a reproduced image of the document.

The document reading section comprises one document holding section for putting a document to be read, one document discharging section for receiving the document which has been read, a document conveying mechanism for conveying the document along a path leading to the document discharging section through a document reading position from the document holding section, and a reading mechanism for reading an image on the document at the position to convert the document image into image data.

The document reading section takes out and conveys a group of sheet documents composing one document one at a time and successively reads an image on each of the sheet documents.

If another document is added and is put on the document holding section during document reading processing, it is possible to continuously run, subsequently to one job (in this case, the document composed of the group of sheet documents), another job. In this case, however, the sheet documents or output images are inevitably mixed up.

So long as a plurality of jobs must be distinguished, therefore, the plurality of jobs cannot be collectively reserved. Accordingly, it is necessary to perform a document setting operation for each of the jobs.

In order to make a copy of the job, which has been copied once, again at another opportunity, all the sheet documents composing the job must be subjected to reading processing again. Consequently, the image data has not been made effective use of, although it is stored in the image memory.

SUMMARY OF THE INVENTION

An object of the present invention is to provide an image output apparatus capable of easily reserving a plurality of jobs.

Another object of the present invention is to provide an image output apparatus which is more conveniently used by making effective use of image data stored in an image storing section.

An image output apparatus comprises an image reading section for reading an image on a document and converting the image into image data; an image storing section for storing the image data read by the image reading section; an image output section for outputting the image corresponding to the document on the basis of the image data stored in the image storing section; an index recognizing circuit for image-recognizing, when an index sheet carrying index information is read by the image reading section, the index information on the index sheet; and an index registering circuit for registering the index information recognized by the index recognizing circuit and storage area designation information for designating a storage area in the image storing section in association with each other; and a circuit for storing the image data representing the document which has been read by the image reading section subsequently to the index sheet in the storage area, in the image storing section, to be designated by the storage area designation information associated with the index information.

In the above-mentioned construction, when the index sheet is read by the image reading section, and the document (a job) is read subsequently to the index sheet, the index information carried on the index sheet and the storage area designation information for designating the storage area in the image storing section are registered with the information associated with each other. The image data representing the document is stored in the storage area, inside the image storing section, to be designated by the registered storage area designation information.

When a plurality of index sheets carrying different index information are appended to the respective heads of a plurality of jobs, and images on the plurality of jobs are continuously read, image data representing the jobs are distinguished for each index information and are stored in the image storing section.

The image data representing the plurality of jobs are thus distinguished and are handled, thereby making it possible to easily reserve the plurality of jobs without requiring complicated work.

It is preferable that the image output apparatus further comprises a circuit for overwriting, when the index information recognized by the index recognizing circuit has already been registered by the index registering circuit, the image data representing the document which has been read by the image reading section subsequently to the index sheet on the storage area, in the image storing section, to be designated by the storage area designation information associated with the index information.

According to this construction, in a case where the document which has been read with the index sheet appended thereto is corrected or revised, for example, when the document which has been corrected is read by the image reading section with an index sheet carrying the same index information appended thereto, image data representing the read document is overwritten in the image storing section. Consequently, it is possible to reduce the consumption of the storage area in the image storing section.

An image output apparatus according to the one embodiment of the present invention further comprises an index image output instruction accepting section for accepting an index image output instruction for outputting the image on the document corresponding to the index information carried on the index sheet, and an index image output control circuit for reading out, when the index recognizing circuit recognizes the index information in a state where the index image output instruction is accepted by the index image output instruction accepting section, the image data, in the image storing section, to be designated by the storage area designation information associated with the recognized index information, and causing the image output section to output the image corresponding to the image data.

According to this construction, when the index image output instruction is entered from the index image output instruction accepting section, and an index sheet carrying index information corresponding to a desired job is then read by the image reading section, it is possible to output image data corresponding to the index information from the image storing section.

With respect to the job which has been read using the index sheet, therefore, an image can be outputted if only an index sheet is prepared after that. Consequently, time and labor required to output the image can be reduced, and required time can be significantly shortened. Moreover, if only the index sheet is suitably managed, the image on the necessary job can be always outputted. Thus, the image output apparatus can be more conveniently used by making effective use of the image data stored in the image storing section.

The apparatus according to a preferred embodiment of the present invention further comprises an index sheet issue instruction accepting section for accepting an instruction to issue the index sheet, and an index sheet output control circuit for outputting the index sheet to the image output section in response to the acceptance of the instruction to issue the index sheet by the index sheet issue instruction accepting section.

According to this construction, the apparatus itself can be made to issue the index sheet. Therefore, there can be provided an image output apparatus which is conveniently used without the need to previously prepare the index sheet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
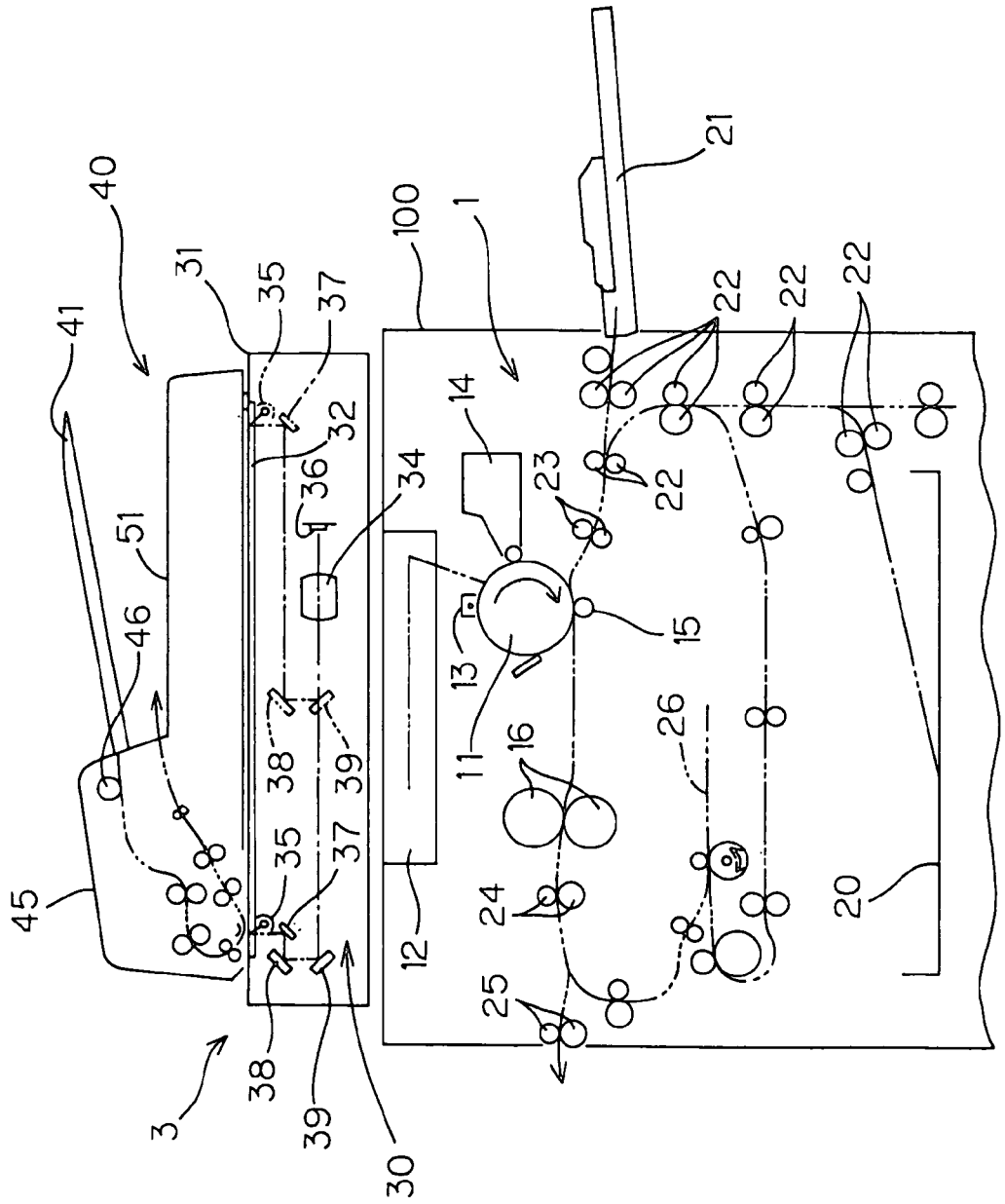
FIG. 1 is an illustrative cross-sectional view showing the construction of a digital copying machine (an image forming apparatus) according to an embodiment of an image output apparatus in the present invention.

FIG. 1 is an illustrative cross-sectional view for explaining the internal construction of a digital copying machine according to an embodiment of an image output apparatus in the present invention. In the digital copying machine, an image forming section 1 serving as an image output section is provided in a main body 100 in the shape of an approximately rectangular parallelepiped, and an image reading section 3 is provided on an upper surface of the main body 100. In the image reading section 3, a scanner unit 30 is contained in a frame 31, and a document conveying unit 40 is provided on an upper surface of the frame 31 such that it can be opened or closed.

The image forming section 1 comprises a photoreceptor 11 in the shape of a right circular cylinder which extends in a direction perpendicular to FIG. 1 and is rotated around its axis, and a laser scanning unit 12 for selectively exposing a surface of the photoreceptor 11 and writing an electrostatic latent image. A charging device 13 for uniformly charging the surface of the photoreceptor 11 before the exposure, a developing device 14 for developing the electrostatic latent image into a toner image, and a transferring device 15 for transferring the toner image to recording paper sheets are provided around the photoreceptor 11.

The recording paper sheets are introduced into the transferring device 15 at predetermined timing by the functions of a paper feeding roller 22 and a registration roller 23 from a paper feeding cassette 20 provided inside the main body 100 or a manual paper feeding tray 21 provided on a side surface of the main body 100.

The recording paper sheets to which toner images have been transferred are introduced into a fixing device 16, where they are subjected to toner image fixing processing, and are then discharged outward from the main body 100 through a delivery roller 24 and a paper discharge roller 25. Reference numeral 26 denotes a switchback device, which is used at the time of a duplex copying operation for forming an image on both surfaces of the recording paper sheet. That is, the switchback device 26 reverses the direction of movement of the recording paper sheets in an intermediate state, which have the image formed on their respective one surfaces, and feeds the recording paper sheets toward the photoreceptor 11 one at a time in a state where the recording paper sheets are turned over at predetermined timing.

A transparent platen 32 is provided on an upper surface of the image reading section 3. A user opens the document conveying unit 40 and puts a document on the transparent platen 32, thereby making it possible to read the document. Further, the document conveying unit 40 is brought into a closed state where it is positioned on the transparent platen 32, thereby making it possible to also perform so-called sheet through scanning of the document while automatically presenting the document to a reading position set in the vicinity of one end of the transparent platen 32 by the document conveying unit 40.

The scanner unit 30 comprises a lamp 35 for illuminating the document presented to the transparent platen 32 from below, a CCD image sensor 36 for detecting light reflected from the document and converting the light into an electric signal, first, second and third reflecting mirrors 37, 38, and 39 for introducing the light reflected from the document into a detection surface of the CCD image sensor 36, and a lens system 34 for forming an optical image of the document onto the detection surface of the CCD image sensor 36. The lamp 35 and the first reflecting mirror 37 are attached to a common first moving frame (not shown), and the second and third reflecting mirrors 38 and 39 are attached to a common second moving frame (not shown). A driving mechanism is constructed such that the first and second moving frames are movable toward the right and left of FIG. 1 along a lower surface of the transparent platen 32, and the second moving frame is moved at a speed which is one-half that of the first moving frame in the same direction as the first moving frame.

When the document is put on the transparent platen 32 to read the document, the scanner unit 30 moves the lamp 35 from one end to the other end of the document, to scan the document.

Contrary to this, when the document is read while conveying the document by the document conveying unit 40, the scanner unit 30 is brought into a state where the lamp 35 stands still in the vicinity of the above-mentioned reading position set in the vicinity of one end of the transparent platen 32 (in the vicinity of a left end in FIG. 1). In this case, the scanning of the document is achieved by the document conveying unit 40 conveying the document.

Figure 2:
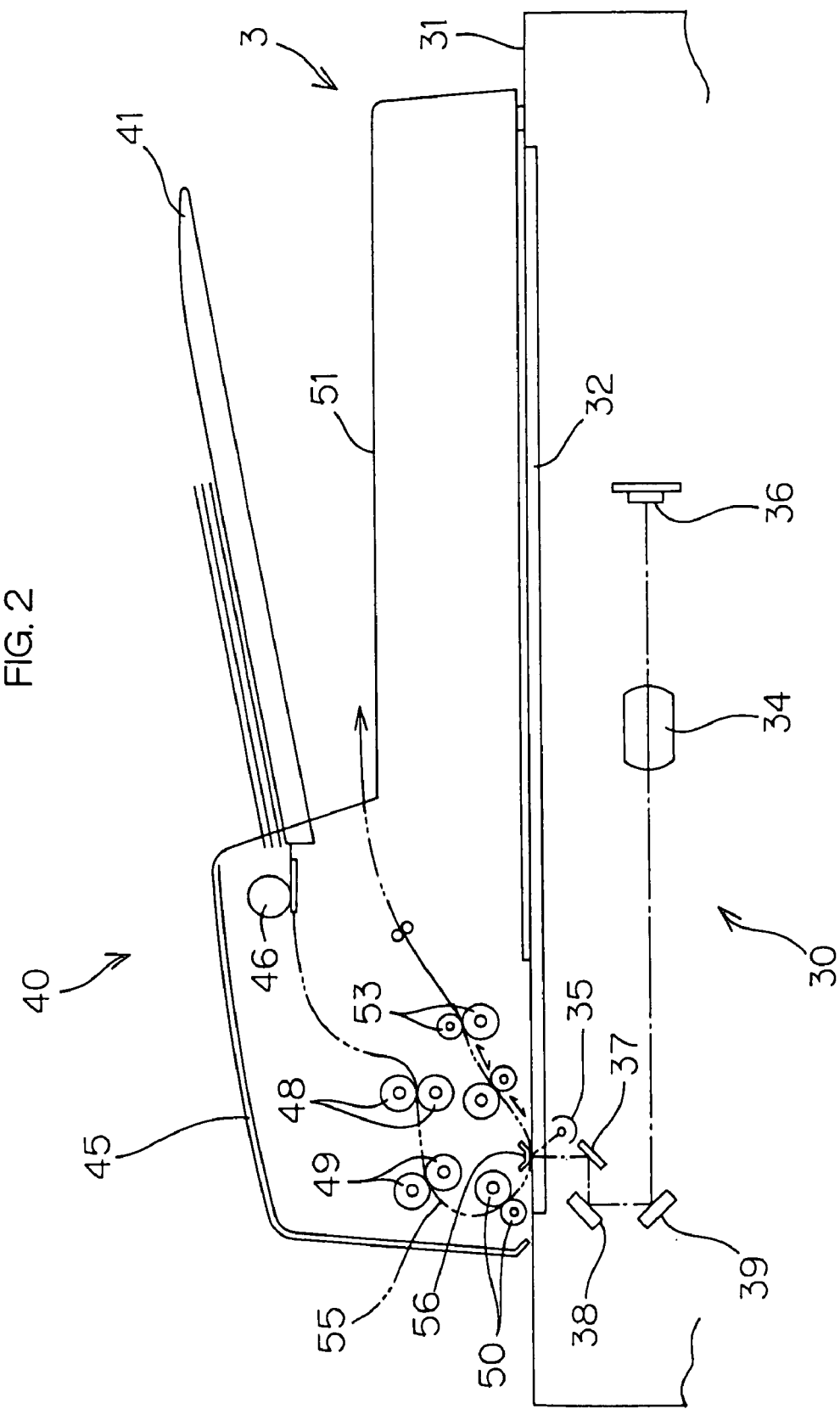
FIG. 2 is an illustrative cross-sectional view showing the construction of a document conveying unit in the digital copying machine.

FIG. 2 is an illustrative cross-sectional view for explaining the details of the construction of the document conveying unit 40. The document conveying unit 40 comprises one document holding section 41 for holding a document to be read. A base end of the document holding section 41 is supported by a unit body 45. A pickup roller 46 is arranged at the base end of the document holding section 41.

The document taken out by the pickup roller 46 is conveyed along a document conveying path 55 successively passing through a pair of separation rollers 48, a pair of registration rollers 49, a pair of paper feeding rollers 50, and a pair of discharge rollers 53, and is discharged into a document discharging section 51 arranged on the downstream side of the pair of discharge rollers 53. The document conveying path 55 passes between a document presenting section 56 and the transparent platen 32 at the reading position set between the pair of paper feeding rollers 50 and the pair of discharge rollers 53. Consequently, in the document presenting section 56, the document is presented to the surface of the transparent platen 32, and is read.

The pair of separation rollers 48 is for preventing feeding of duplicate documents. Further, the pair of registration rollers 49 has the function of mainly regulating a front end of the document in a direction perpendicular to the direction of document conveyance, to prevent oblique feeding of the document.

Figure 3:
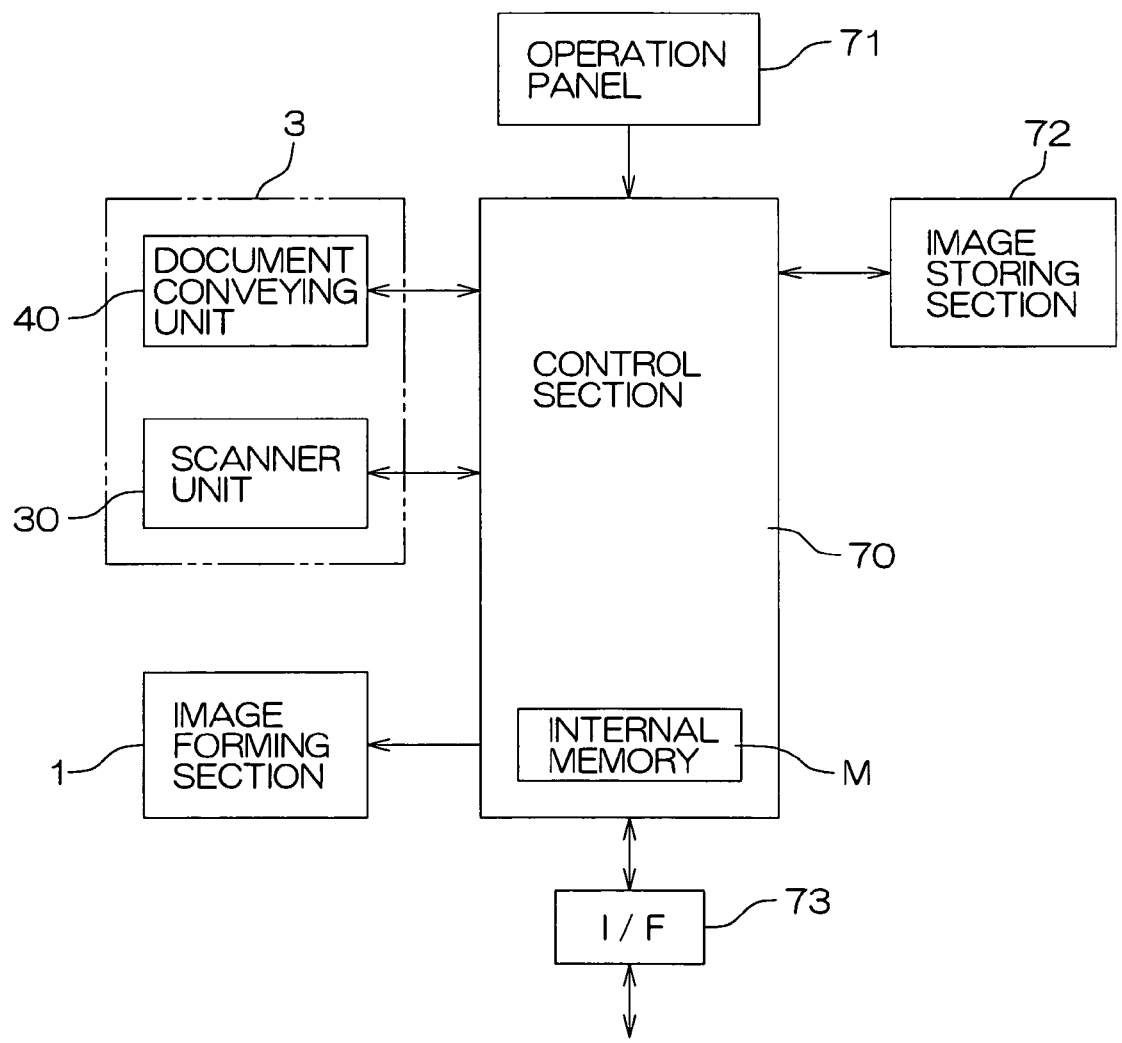
FIG. 3 is a block diagram showing the electrical configuration of a principal part of the digital copying machine.

FIG. 3 is a block diagram showing the electrical configuration of a principal part of the digital copying machine. An instruction signal from an operation panel 71 provided at a predetermined position on the upper surface of the frame 31 in the image reading section 3, for example, is inputted to a control section 70 composed of a microcomputer.

The image reading section 3, an image storing section 72 for storing image data representing an image read by the image reading section 3, an image forming section 1, an interface (I/F) 73 for data communication with another equipment, and so forth are further connected to the control section 70. The image storing section 72 is preferably one having a large capacity capable of storing a plurality of document images, and can be constituted by a programable recording medium such as a semiconductor memory or a hard disk drive.

Figure 4:
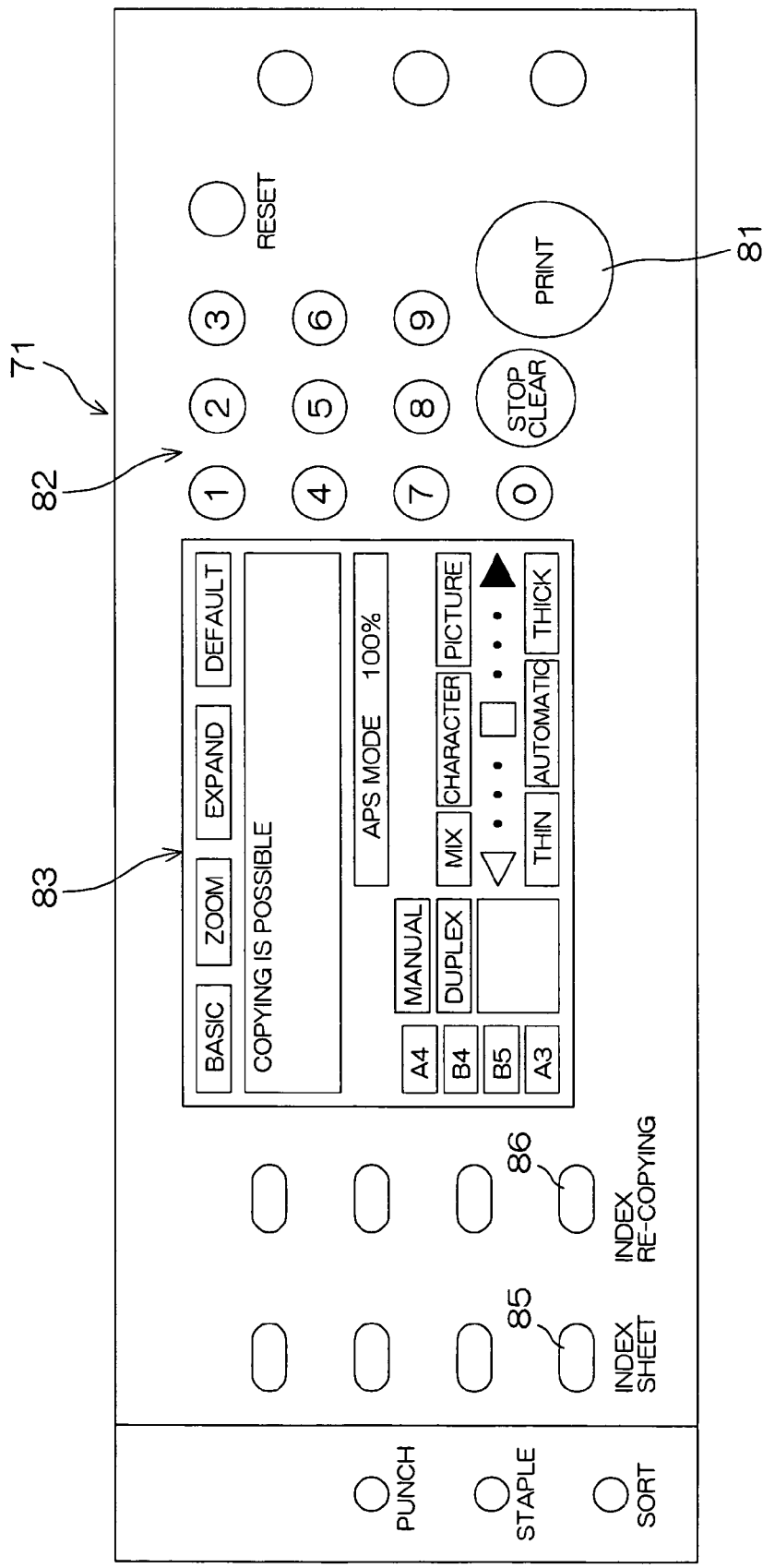
FIG. 4 is a plan view showing an example of the structure of an operation panel.

FIG. 4 is a plan view showing an example of the structure of the operation panel 71. The operation panel 71 comprises a print key 81 for starting a copying operation, a ten-key 82 for entering the number of copies, etc., a liquid crystal display section 83 with a touch panel, an index sheet issuing key 85 for giving an instruction to issue an index sheet, described later, an index re-copying key 86 for an index re-copying function, described later, and so forth. Various types of messages as well as setting keys for performing various types of setting such as a document size, a paper size, a magnification, a copying density, and duplex copying are displayed on the liquid crystal display section 83.

Figure 5:
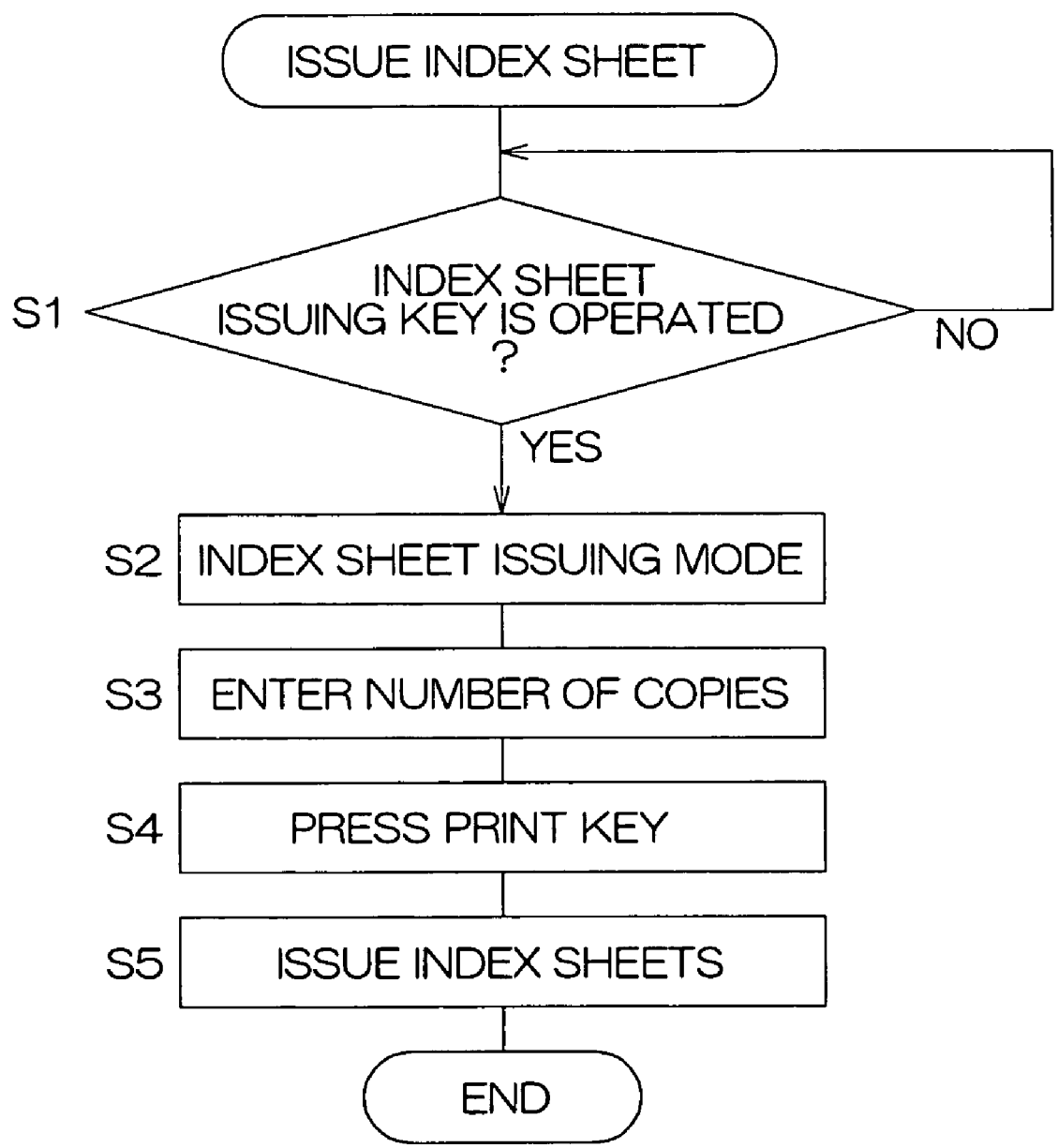
FIG. 5 is a flow chart for explaining processing for issuing an index sheet.

FIG. 5 is a flow chart for explaining processing for issuing an index sheet. When an operator operates the index sheet issuing key 85 (step S1), the digital copying machine enters an index sheet issuing mode by the function of the control section 70 (step S2). In this state, an operator enters a necessary number of copies (step S3), and presses the print key 81 (step S4), index sheets whose number corresponds to the entered number of copies are issued (step S5).

The index sheet is a sheet obtained by recording index information on a paper sheet of predetermined size (for example, A4 size, which may be the same size as that of the document), for example. The index sheet can be prepared by causing the laser scanning unit 12 to write the index information to perform an image forming operation. The index information may be composed of a single-digit or plural-digit number, English characters, or alphabetic characters which are a mixture of numerical characters and English characters. In addition thereto, characters such as hiragana, katakana, or kanji and symbols in a predetermined shape (■, ●, etc.) may be of course used. However, it is preferable that the type and the number of symbols which should compose index information are determined from the viewpoint of facility of image recognition processing.

When a plurality of index sheets are issued, the index sheets respectively carry different index information thereon. That is, a plurality of index sheets respectively carrying successive numbers thereon, for example, are issued.

Figure 6:
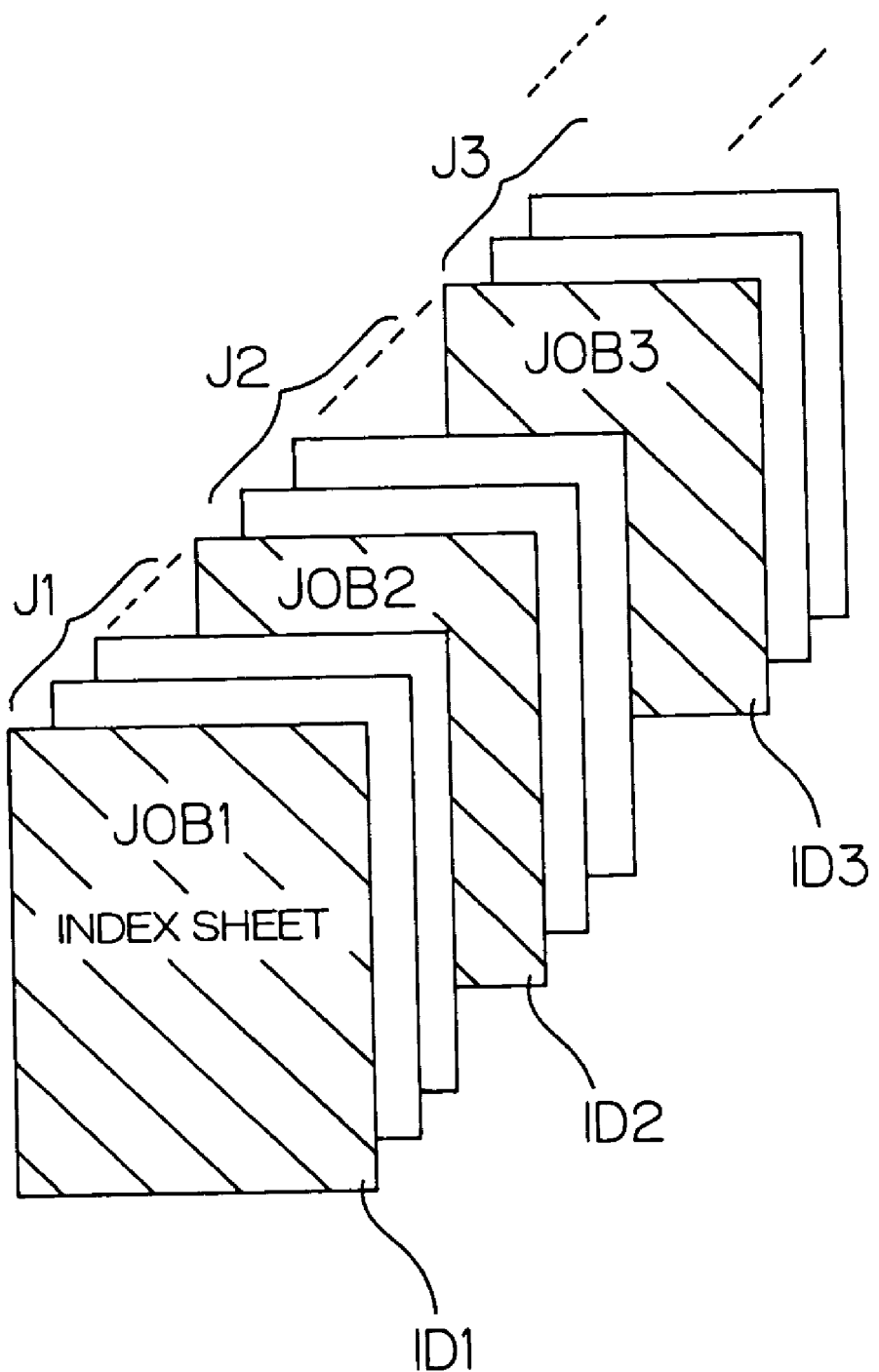
FIG. 6 is a diagram for explaining the manner of use of an index sheet.

Index sheets ID1, ID2, ID3, . . . thus issued are appended to the respective first pages of a plurality of jobs J1, J2, J3, . . . , as indicated by hatching in FIG. 6. Each of the jobs is a document composed of one or a plurality of sheet documents. The number of index sheets to be issued is made equal to the number of jobs which are desired to be reserved at a time.

The plurality of jobs J1, J2, J3, . . . to which the index sheets ID1, ID2, ID3, . . . are thus appended are collectively put on the document holding section 41 in the document conveying unit 40. Thereafter, when the print key 81 is pressed, the index sheets ID1, ID2, ID3, . . . appended to the jobs J1, J2, J3, . . . are conveyed in the order listed, and are read.

Figure 7:
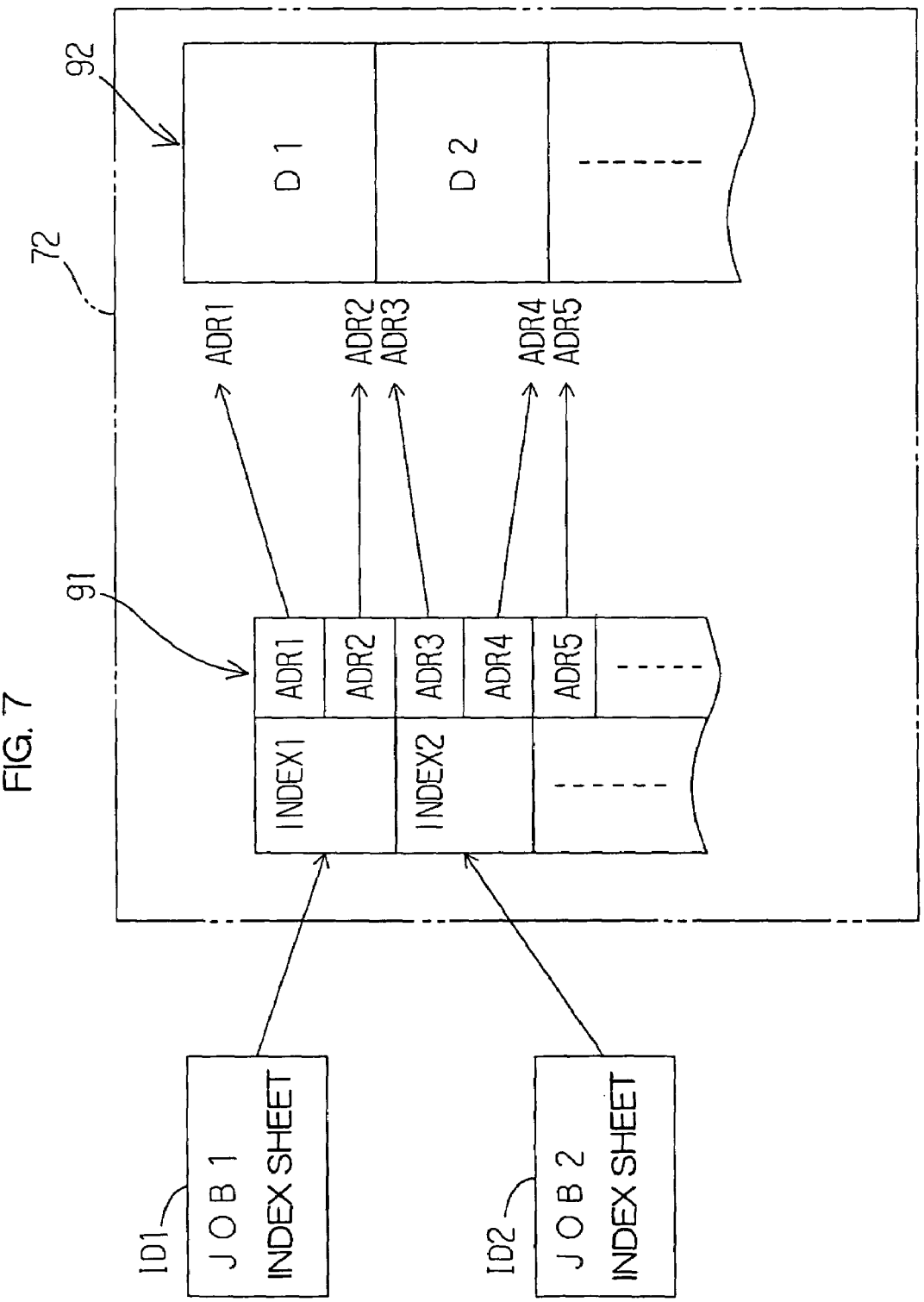
FIG. 7 is a diagram for explaining the manner of storage of data in an image storing section.

FIG. 7 is a diagram for explaining the manner of storage in the image storing section 72. In the image storing section 72, an index information storing section 91 and an image data storing section 92 are prepared. The index information storing section 91 stores an index registration table for associating index information with an address range for designating a storage area in the image data storing section 92.

Specifically, when the index sheets ID1, ID2, ID3, . . . are read prior to reading the jobs J1, J2, J3, . . . index information INDEX1, INDEX2, INDEX3, which are respectively carried thereon are registered in the index information storing section 91, and image data D1, D2, D3, . . . relating to the jobs J1, J2, J3 . . . are stored in the image data storing section 92. Respective starting and ending addressees ADR1 and ADR2, ADR3 and ADR4, ADR5 and ADR6, . . . in storage areas respectively storing the image data D1, D2, D3, . . . are registered in the index information storing section 91 in association with the index information INDEX1, INDEX2, INDEX3, . . .

Figure 8:
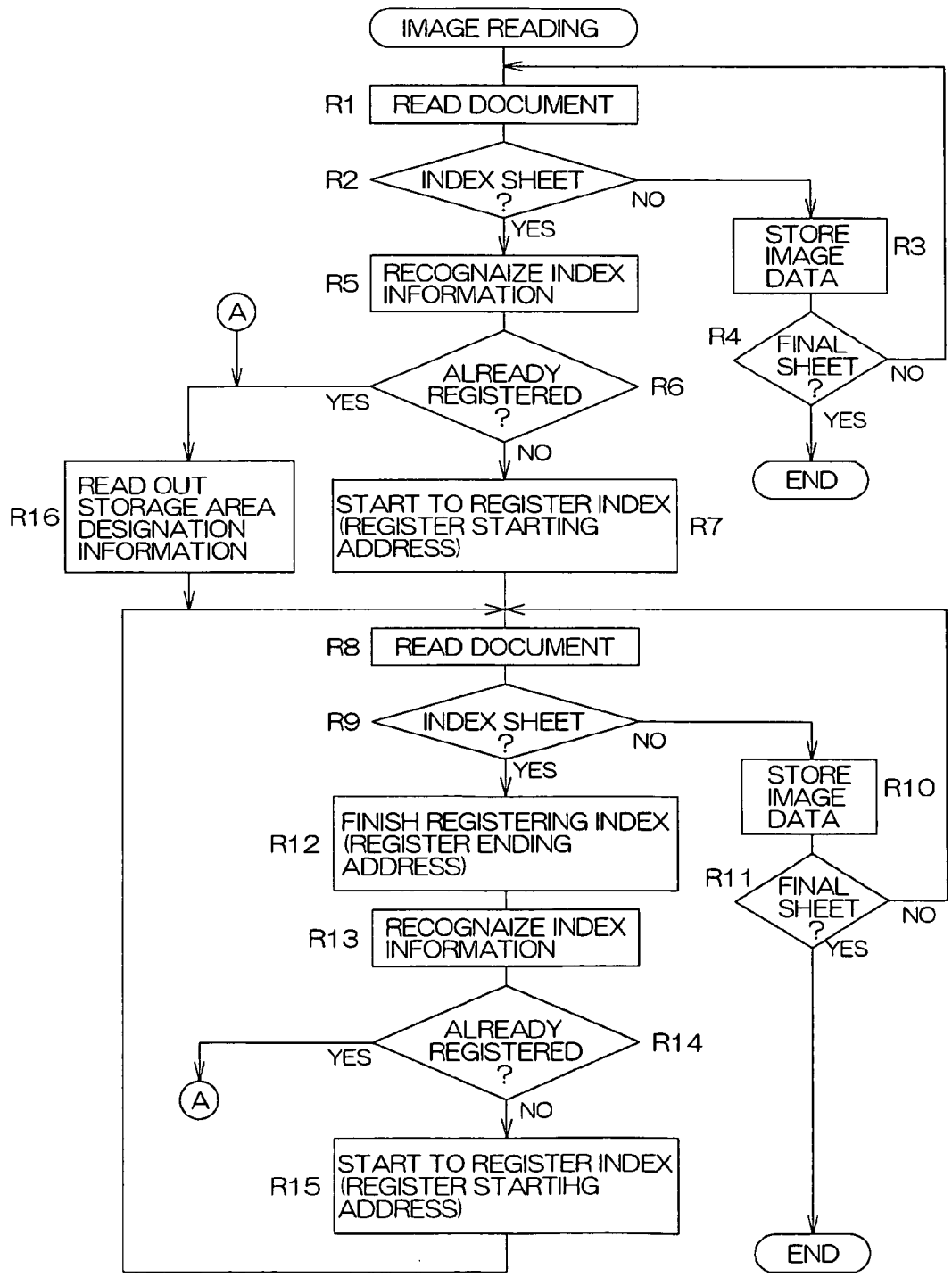
FIG. 8 is a flow chart for explaining image reading processing.

FIG. 8 is a flow chart for explaining image reading processing. When the print key 81 is pressed, the control section 70 causes the document conveying unit 40 to start the conveyance of a document, to read the document (step R1). In the process of the conveyance, image data outputted by the CCD image sensor 36 is stored once in an internal memory M in the control section 70. The control section 70 judges whether or not an index sheet is read on the basis of the stored image data (step R2). If the index sheet is not read, image data representing a read image is stored in the image storing section 72 (step R3). If the image is ready for outputting, the image data is read out of the image storing section 72 and is fed to the image forming section 1, to perform an image output operation. If the sheet of which the image data has been stored is the final sheet document, the processing is terminated; otherwise the processing at the step R1 and the subsequent steps is repeated (step R4).

When it is judged that the index sheet has been read (step R2), the control section 70 recognizes index information on the basis of the image data stored in the internal memory M (step R5). Known character recognition processing can be applied to the index information recognition processing. In this case, if the index information is composed of alphanumeric characters, for example, on the assumption that the index sheet is issued by the digital copying machine, the type of characters to be recognized is significantly limited, thereby making it possible to reduce the amount of information in a dictionary for recognition.

When the index information is recognized, the index information storing section 91 in the image storing section 72 is examined, and it is judged whether or not the recognized index information has already been registered (step R6). If the recognized index information has not been registered yet, the recognized index information is registered in the index information storing section 91, and a starting address in a free area of the image data storing section 92 is registered in association with the index information (step R7).

An image on the subsequent sheet document is then read, and image data corresponding to the image is stored in the internal memory M (step R8) It is judged whether or not the index sheet has been read on the basis of the image data (step R9). When the first page of the job J1 is read subsequently to the index sheet ID1, the judgment is denied, so that the image data in the internal memory M is written into the image data storing section 92 in the image storing section 72 (step R10). In this case, the writing of the image data begins at the starting address which has been registered at the step R7.

It is then judged whether or not the final sheet is read (step R11). If the final sheet is not read, the processing at the step R8 and the subsequent steps is repeated. Consequently, loop processing at the steps R8 and R11 is repeated while sheet documents composing the job J1 are being read. Accordingly, the image data D1 representing the job J1 is stored in the storage area from the starting address ADR1 which has been registered in correspondence with the index information INDEX1 relating to the index sheet ID1.

When the index sheet ID2 appended to the head of the subsequent job J2 is read (step R8), the judgment at the step R9 is positive, so that the program proceeds to the step R12. That is, at the step R12, the ending address ADR2 corresponding to the index information INDEX1 is registered in the index information storing section 91.

As in the case at the step R5, the index information INDEX2 carried on the index sheet ID2 is image-recognized (step R13). Further, as in the case at the step S6, it is judged whether or not the recognized index information has already been registered (step R14). If the index information has not been registered yet, the index information INDEX2 and the starting address ADR3 in the storage area storing the image data corresponding to the index information are stored in the index information storing section 91 with the information associated with each other (step R15) Thereafter, the processing at the step R8 and the subsequent steps is repeated.

When processing of the final sheet document is thus completed (YES at step R11), index information, image data storage area designation information (a starting address and an ending address) corresponding thereto, and image data are stored in the manner shown in FIG. 7.

On the other hand, when it is judged at the step R6 or R14 that the recognized index information has already been registered, the control section 70 refers to the index information storing section 91, to read out the starting address (image data storage area designation information) associated with the recognized index information (step R16), and the image data representing the read image is stored in the storage area from the starting address (steps R8 and R10). Consequently, the image data is overwritten with respect to the job subsequent to the index sheet supporting the index information which has already been registered.

When the job which has been read once is corrected or revised, therefore, the image data can be updated without newly consuming the storage area in the image storing section 72 if the job is read again with the same index sheet (an index sheet carrying the same index information thereon) appended thereto.

Figure 9:
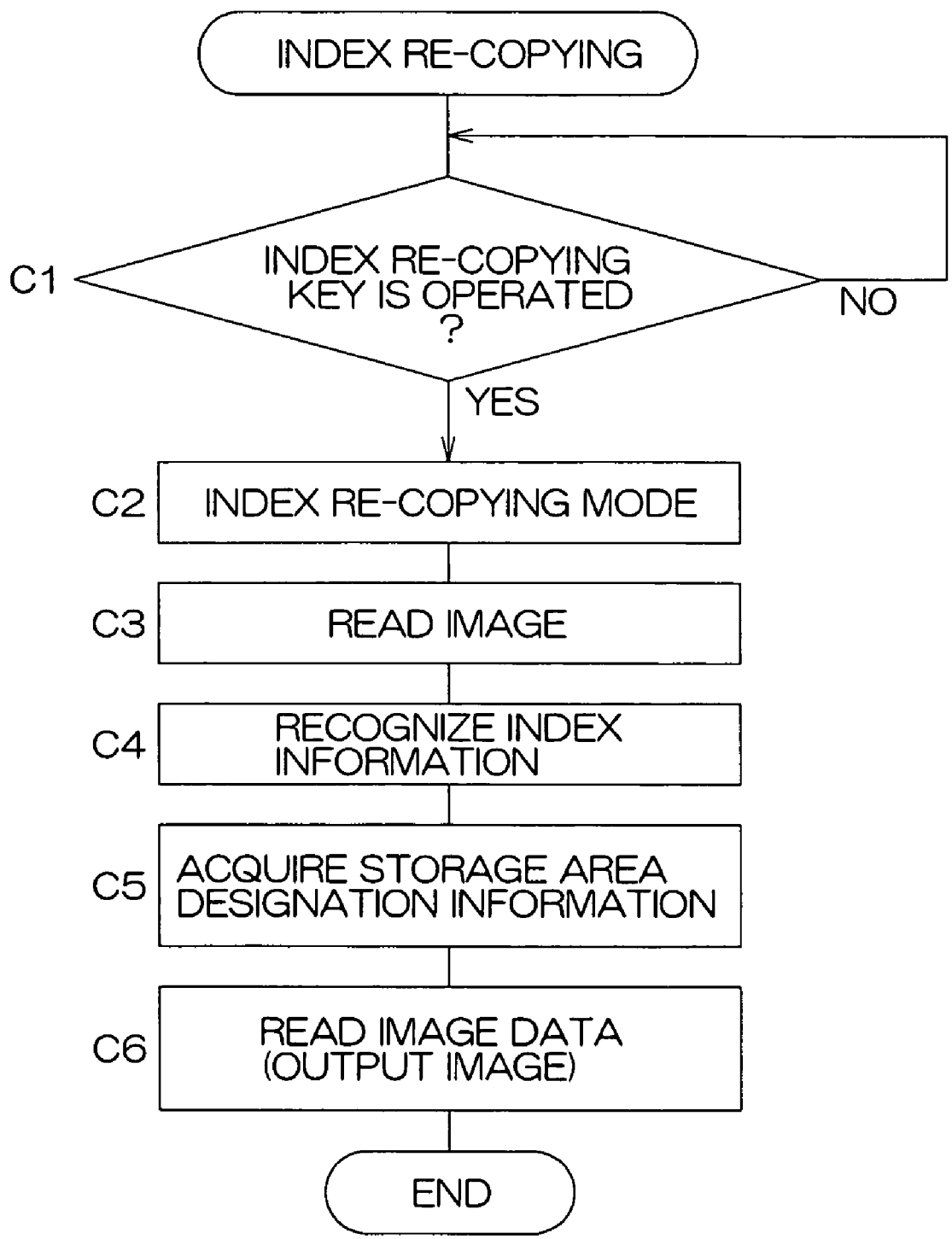
FIG. 9 is a flow chart for explaining an index re-copying function.

FIG. 9 is a flow chart for explaining an index re-copying function. Index re-copying is a function for performing image output processing using only an index sheet on the basis of image data stored in the image storing section 72 in association with index information.

Specifically, when the index re-copying key 86 on the operation panel 71 is operated (step C1), the control section 70 brings the digital copying machine into an index re-copying mode (step C2). In this case, an operator sets only an index sheet corresponding to a desired job on the document holding section 41 in the document conveying unit 40. Further, copying conditions such as the number of copies are entered as required.

When the print key 81 is pressed in this state, the document conveying unit 40 is operated, so that the index sheet is read, and image data representing the index sheet is stored in the internal memory M (step C3). The control section 70 performs image recognition processing on the basis of the image data in the internal memory M, to recognize index information (step C4). The recognized index information is retrieved from the index information storing section 91 in the image storing section 72, to acquire image data storage area designation information (a starting address and an ending address) corresponding to the index information (step C5).

Thereafter, the control section 70 reads out image data from a storage area designated by the image data storage area designation information, and feeds the image data to the image forming section 1 (step C6). Consequently, processing for outputting an image on the job corresponding to the read index sheet is performed.

As described in the foregoing, according to the present embodiment, when an index sheet is appended to the head of each of a plurality of jobs, and the plurality of jobs are collectively set in the one document holding section 41 and are read, image data representing the jobs are distinguished and are stored in the image storing section 72. Consequently, processing for reading the plurality of jobs can be continuously performed (that is, the plurality of jobs can be collectively reserved), and the jobs are not mixed up. That is, index information relating to each of the jobs and storage area designation information relating to the image data representing the job are registered in the index information storing section 91 and are managed.

When an image is outputted, the control section 70 reads out image data, in a storage area, to be designated by image data storing area designation information corresponding to index information is read out of the image storing section 72, and is fed to the image forming section 1. Consequently, the control section 70 can distinguish and handle image data representing jobs, and does not mix up the image data. That is, when recording paper sheets on which an image has been recorded are discharged, for example, sorting processing can be performed by making the position where the recording paper sheets are discharged differ for each job, for example.

Index information as well as image data stored in the image storing section 72 can be outputted after that only by reading an index sheet even if all corresponding jobs are not set in the document holding section 41. Consequently, the image data stored in the image storing section 72 can be made effective use of, thereby making it possible to more conveniently use the digital copying machine.

Although the image output processing by the image forming section 1 is started as soon as an image is ready for outputting after image data is read, it is preferable that the image reading processing and the image output processing are simultaneously performed when a lot of sheet documents are read. When the image need not be necessarily formed on recording paper sheets, however, the image data may be only stored in the image storing section 72, not to perform image forming processing. Even in this case, the image output processing can be performed using only an index sheet, as required, in the future.

Although description has been made of one embodiment of the present invention, the present invention can be also embodied in another embodiment. Although in the above-mentioned embodiment, description has been made of an example in which an image corresponding to a document is formed on recording paper sheets as image output processing, other examples of the image output processing are processing for sending out image data via a communication line and processing for recording image data on a suitable recording medium.

Although in the above-mentioned embodiment, description has been made of a case where job reading processing is performed using the document conveying unit 40, document reading processing can be also performed, in the same manner as that in a case where a document is automatically fed by the document conveying unit 40, in a case where a sheet document or a book document is manually put on the transparent platen 32 and is read, subsequently to an index sheet. That is, the image data can be stored in the image storing section 72 in a state where it is managed by index information.

Although in the above-mentioned embodiment, description has been made by taking as an example an apparatus comprising one document holding section 41, two or more document holding sections may be provided in the document conveying unit to set a plurality of jobs in the document holding sections.

Although the present invention has been described and illustrated in detail, it is clearly understood that the same is by way of illustration and example only and is not to be taken by way of limitation, the spirit and scope of the present invention being limited only by the terms of the appended claims.

The application claims priority benefits under 35 USC § 119 of Japanese Patent Application Serial No. 11-296943 filed with the Japanese Patent Office on Oct. 19, 1999, the disclosure of which is incorporated herein by reference.

What is claimed is:
1. An image output apparatus, comprising:
   an image reading section for reading an image on a document and converting the image into image data;
   an image storing section for storing the image data read by the image reading section;
   an image output section for outputting the image corresponding to the document on the basis of the image data stored in the image storing section;

an index sheet issue instruction accepting section for accepting an instruction to issue an index sheet;

an index sheet output control circuit for causing the image output section to output an index sheet in response to the acceptance of the instruction to issue the index sheet by the index sheet issue instruction accepting section, the index sheet output by the image output section carrying index information;

an index recognizing circuit for image-recognizing, when the index sheet is read by the image reading section, the index information on the sheet;

an index information storing section arranged to store an index registration tables;

an index registering circuit for registering, in response to image recognition by the index recognizing circuit, the index information recognized by the index recognizing circuit and corresponding storage area designation information for designating a storage area in said image storing section, associated with each other in the index registration tables, the index registering circuit generating the storage area designation information upon the image recognition of the index information by the image recognizing circuit; and a circuit for storing the image data representing the document, which has been read by the image reading section subsequently to the index sheet, in a storage area of the image storing section designated by the storage area designation information associated with the index information, the index sheet having been output by the image output section under control of the index sheet output control circuit.

2. The image output apparatus according to claim 1, further comprising:

recognizing circuit for overwriting, when the index information recognized by said index recognizing circuit has already been registered by said index registering circuit, the image data representing the document which has been read by said image reading section subsequently to the index sheet on the storage area, in said image storing section which is to be designated by the storage area designation information associated with the index information.

3. The image output apparatus according to claim 1, further comprising:

an index image output instruction accepting section for accepting an index image output instruction for outputting a document image corresponding to the index information carried on the index sheet, and an index image output control circuit for reading out, when said index recognizing circuit recognizes the index information in a state where the index image output instruction is accepted by the index image output instruction accepting section, the image data, in said image storing section, to be designated by the storage area designation information associated with the recognized index information, and causing the image output section to output the image corresponding to the image data.

4. The image output apparatus according to claim 3, wherein the image output section outputs and records the image of the document a recording sheet, and the index image output control circuit causes the image output section to discharge recording sheets to different positions for image data of respective documents.

* * * * *